United States Patent [19]

Roca

[11] 4,159,071
[45] Jun. 26, 1979

[54] PIVOTABLE UTILITY TABLE

[76] Inventor: Hank Roca, 5495 W. 14th Ave., Hialeah, Fla. 33012

[21] Appl. No.: 872,838

[22] Filed: Jan. 27, 1978

[51] Int. Cl.² ............................................. A47B 39/00
[52] U.S. Cl. .................................... 297/163; 297/191; 297/146; 108/42; 16/163
[58] Field of Search ............... 297/146, 194, 191, 163, 297/167, 284; 16/163; 108/42, 45; 296/37; 244/188 P, 122 R

[56] References Cited

U.S. PATENT DOCUMENTS

| | | | |
|---|---|---|---|
| 85,544 | 1/1869 | Stewart | 297/169 |
| 1,653,992 | 12/1928 | Peterson | 16/163 |
| 1,689,664 | 10/1928 | Covell | 16/163 |
| 3,009,737 | 11/1961 | Burnett | 297/146 |
| 3,402,422 | 9/1968 | Baer | 16/163 |
| 3,632,161 | 1/1972 | Arfaras et al. | 297/194 |
| 3,773,381 | 11/1973 | Brennan | 297/163 |
| 3,795,422 | 3/1974 | Robinson et al. | 297/191 |
| 3,877,747 | 4/1975 | Brennan et al. | 297/191 X |

*Primary Examiner*—Roy D. Frazier
*Assistant Examiner*—Peter A. Aschenbrenner
*Attorney, Agent, or Firm*—Eugene F. Malin; Barry L. Haley

[57] ABSTRACT

An improved utility table mounted on the back of a reclinable seat, such as those found in commercial airplanes, for use by the passenger occupying a second seat immediately behind the first seat. The table top includes forward and rearward sections which fold onto each other. The utility table is removeably supported by arms which are pivotally attached to the back of the first seat. The rearward section is connected to the forward section by hinge means. When the rearward section is folded onto the forward section the table may then be used as a small table for holding drinks. Thereafter the folded table may be pivoted as a unit into the first seat back for storage.

6 Claims, 7 Drawing Figures

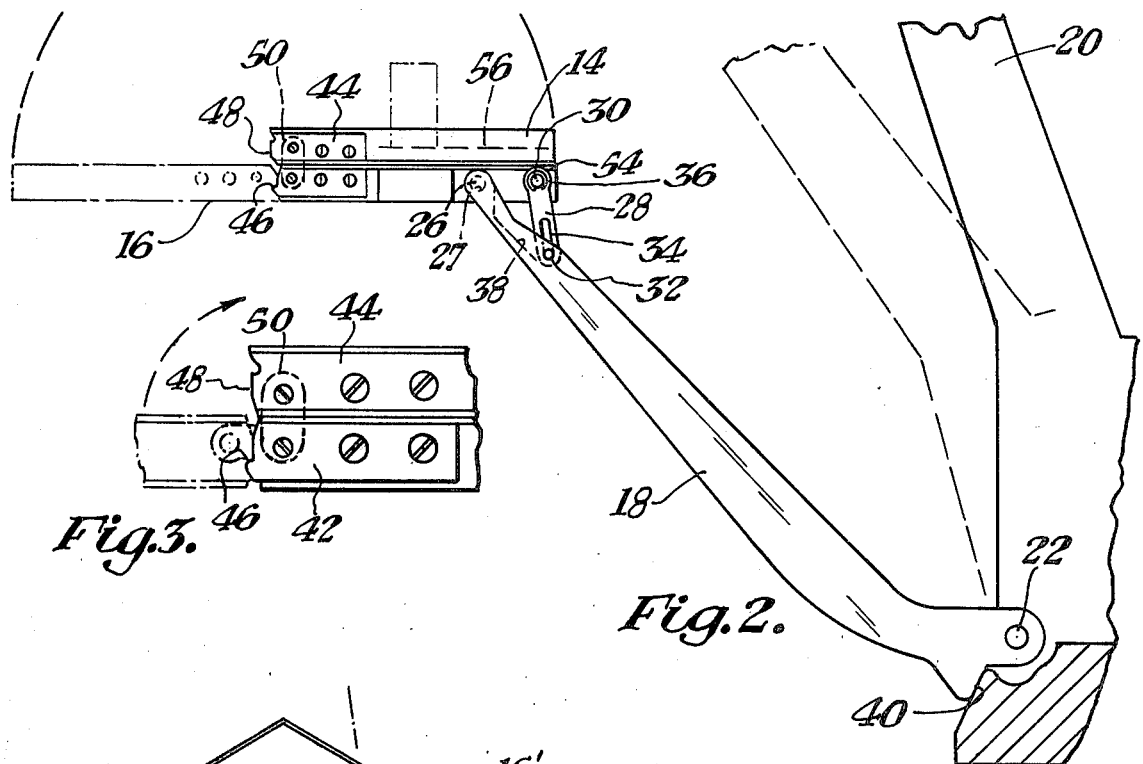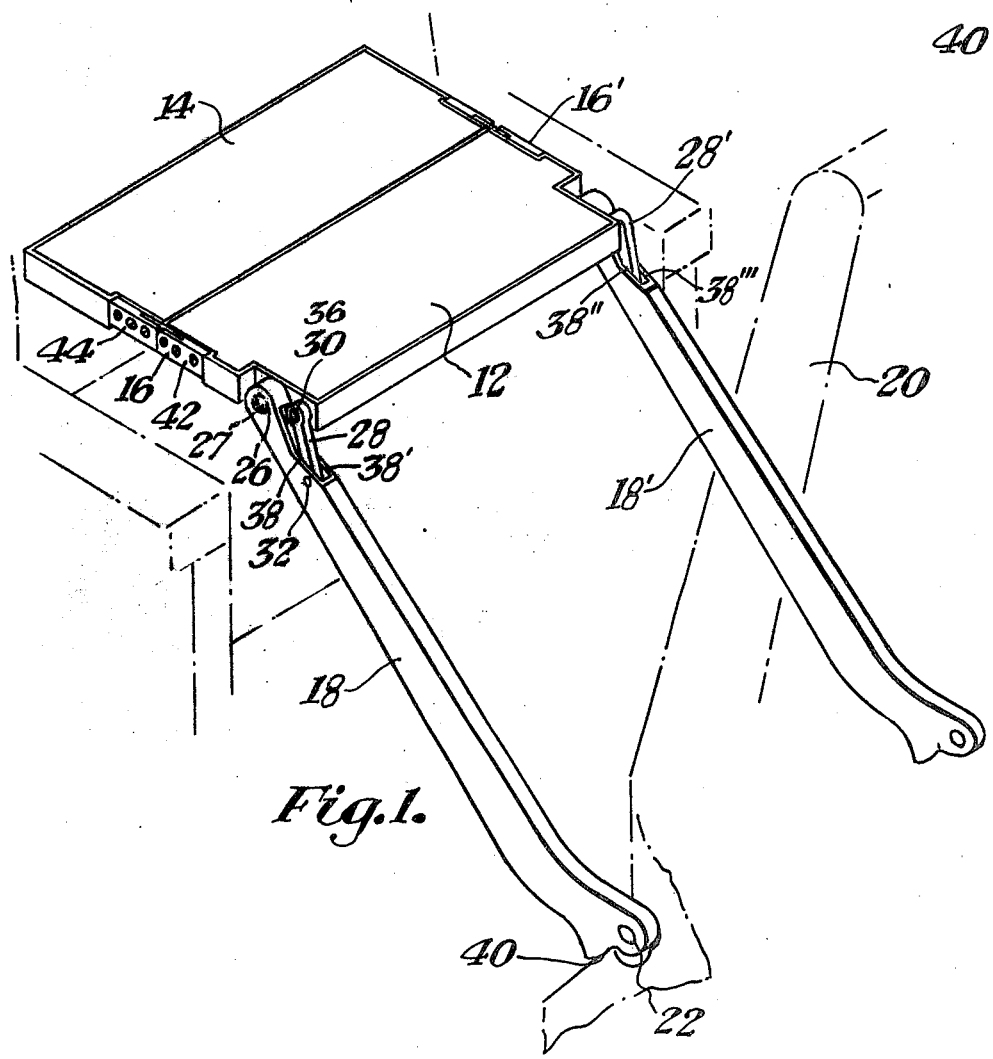

PIVOTABLE UTILITY TABLE

BACKGROUND OF THE INVENTION

The present invention relates to a storable tray and more particularly to an easily removable bi-folding tray which is pivotally attached to and retracted into the rear of the seat back of the forward seat, such as those found in commercial airplanes.

SUMMARY OF THE INVENTION

The present invention provides an improved pivotal seat back tray, and is described herein in detail as it relates to storable seat back trays generally found on commercial airplanes.

It is an object of the present invention to provide a pivotal seat back tray with an improved hinge means to fold a rear section of the tray onto a forward section.

It is another object of the present invention to provide a pivotal seat back tray with a hinge means which has mated notches in the bearing surfaces to distribute the opening forces in both a vertical and horizontal direction.

It is still another object of the present invention to provide an improved bi-folded pivotal seat back tray system with a depression in the bottom of the rearward tray section, so that when the tray is folded onto itself the depression is rotated and becomes a small top surface for holding drinks or the like.

It is a further object of the present invention to provide a pivotal seat back tray with an improved light weight internal frame that is fastened together with adhesive and is filled and covered with a light weight structural material.

It is still a further object of the present invention to provide an improved means for easily attaching a bi-folded pivotal seat back tray to pivotal arms which will reduce replacement time.

In accordance with these and other objects which will be apparent hereinafter, the instant invention will be described with particular reference to the accompanying drawings.

BRIEF DESCRIPTION OF THE DRAWINGS

The present invention is herein described and illustrated with respect to particular preferred embodiments thereof, as illustrated in the accompanying drawings wherein:

FIG. 1 is an isometric view of the table in the fully extended position.

FIG. 2 is a side elevational view of the table with the rearward section of the table rotated onto the forward section for holding drinks and the like, and the forward section in extended position in phantom, with the seat back shown in phantom in a reclined position.

FIG. 3 is an enlarged elevation of the table hinge.

DESCRIPTION OF THE PREFERRED EMBODIMENT

Figure 4:
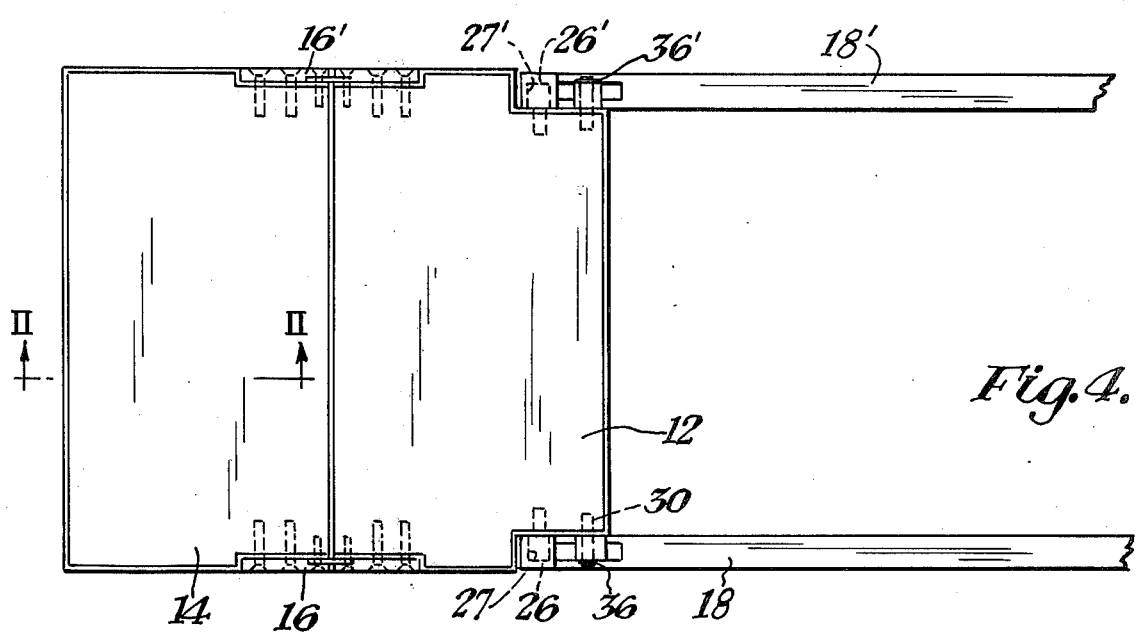
FIG. 4 is a plan view of the table in the fully extended position.

Referring to the drawings illustrating a preferred embodiment of the invention and more particularly FIGS. 1, 2, 3 and 4, a pivotal table 10 is shown having a generally rectangular tray with a forward member 12 and a rearward member 14, hinge means 16, 16' connecting said forward 12 and rearward 14 tray members and, connecting means 18, 18' which pivotally mounts said tray 12, 14 to the back of the preceeding seat 20 by pivot means 22, 22'. FIG. 5 shows the bi-folded pivotal table 10 retracted into said seat back 20. The table 10 is held in place in the seat back 20 by latching mechanism 24.

Figure 5:
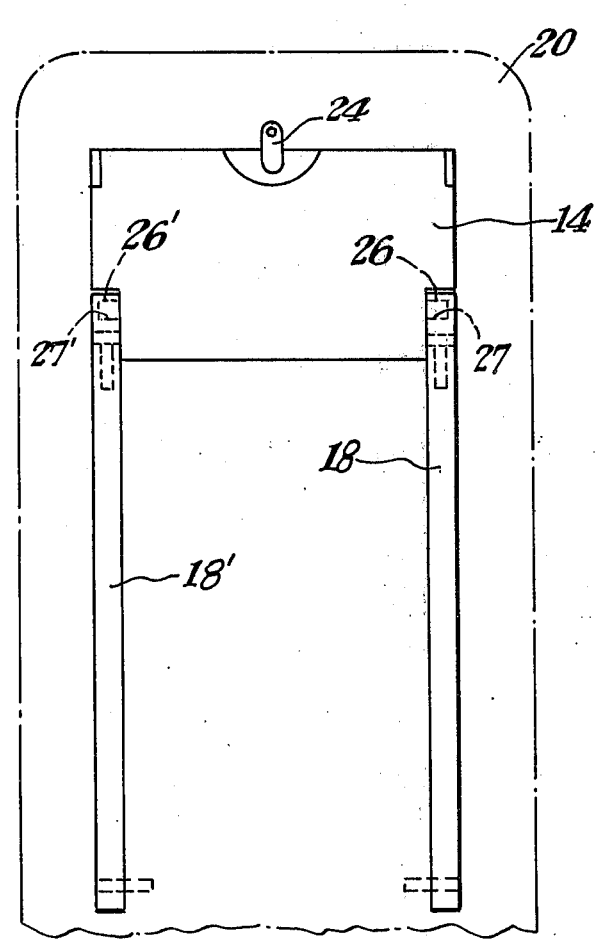
FIG. 5 is a front elevational view of the table stored in the seat back.

As shown in FIGS. 2 and 4, the forward table tray 12 is connected to said connecting means 18, 18' by pivot pins 26, 26' through partial aperture 27, 27'. Said forward table tray 12 is also connected to retaining arm 28, 28' by pivot pins 30, 30' in aperture 31, 31'. The opposite end 29, 29' of said retaining arm 28, 28' is connected to pivot pins 32, 32' and moves about said pin 32, 32' within an elongated aperture 34, 34'. Retaining arm 28, 28' is removably fastened to said pivot pin 30, 30' by a fastening means 36, 36' such as a conventional snap-ring which could fit into a circumferential groove at the outer end of said pin.

The removal or replacement of said tray is accomplished by removing fastening means 36, 36' and moving said retaining arms 28, 28' in an opposite and outward direction until pivot pin 30, 30' is completely removed from circular aperture 31, 31'. When said pivot pin 30, 30' is removed from said aperature 31, 31' said connecting means 18, 18' will also be removed from partial aperture 27, 27' since said opposite end 29, 29' of said retaining arm 28, 28' is disposed between adjacent walls 38, 38', 38" and 38'" thereby causing said connecting means 18,18' to move outwardly and inwardly with retaining arm 28, 28'.

The connecting means 18, 18' is pivotally attached to the preceeding seat back 20 by pivot pin 22, 22' so that a fully extended table 10 is not affected by the reclining of said seat back 20 as shown in dashed line in FIG. 2. Said table 10 is held in this fully extended horizontal position by a conventional commercial airline stop means 40 as shown in FIG. 2.

Hinge means 16, 16' includes a generally rectangular forward member 42, 42' with a notched arcuate rear bearing surface 46 which mates with an oppositely notched arcuate forward bearing surface 48 on the generally rectangular rear hinge member 44. Said forward hinge member 42 and rearward hinge member 44 are moveably connected by a link 50, 50'. Said notched bearing surfaces 46, 46', and 48, 48' prevent downward slippage of the rearward member 14 when said member is coplanar with said forward member 12 as shown in FIG. 1.

Figure 6:
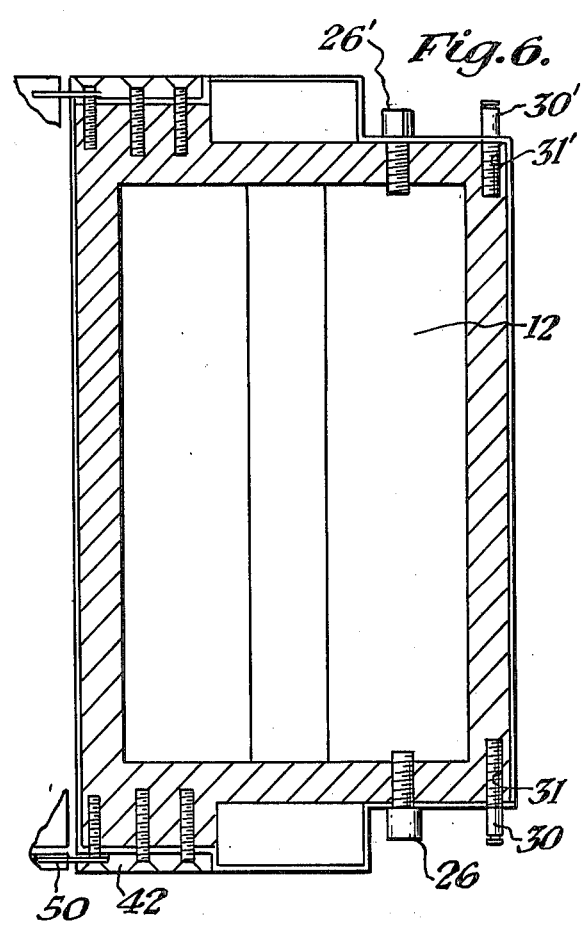
FIG. 6 is a cross section of FIG. 2, taken along line I—I and looking in the direction of the arrow.
Figure 7:
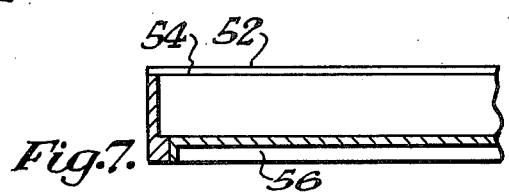
FIG. 7 is a cross section of FIG. 4, taken along line II—II and looking in the direction of the arrow.

To make the tray of the present invention fire retardant and light weight but still have the necessary strength for commercial airplane use, a support frame, as shown in FIGS. 5 and 6, made of aluminum and secured together with epoxy or similar adhesive is filled with fire retardent foam by a vacuum forming, injection molding or similar manufacturing process and covered with an outer shell of fire retardent plastic and then covered on the top surface 54, 54' by formica 52 or similar hard material. The rearward tray has a depression 56 formed on the bottom side.

The tray of the present invention may be folded as in FIG. 2, such that the rearward tray member 14 is rotated about hinge means 16 onto the forward tray member 12. When said rearward tray member 14 is in the folded position the depression 56 may be used for holding glasses or the like. Similarly when the table 10 is in a folded position, said table may be pivoted about pivot pin 26, 26′ and thereby retracted into the seat back 20 by pushing the trays 12 and 14 into a near vertical position.

The present invention may also be a single piece utility table removeably secured to and pivotable about said connecting means 18 and 18′ by the aforementioned fastening means 36 and 36′.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a vehicle utility table adapted for use on a substantially upright seat back with;
    a substantially rectangular tray for use in a generally horizontal position and,
    a connecting means moveably connecting said tray to a seat back for storage into said seat back when not in said ordinary horizontal use,
    the improvement comprising:
    a substantially rectangular forward tray section moveably connected to said connecting means for movement between a horizontal position and a storage position in said seat back,
    a substantially rectangular rearward tray section pivotably positionable from a first generally horizontal position in the plane of said forward tray section to a second position foldable upon said forward tray section for increasing occupant seating space while using said utility table, and
    a hinge means connecting said forward tray section to said rearward tray section, said hinge means having a notched forward portion vertically adjacent the outside rear of said forward tray section, a complementary notched rearward portion vertically adjacent the outside front of rearward tray section and a connecting link enclosed entirely within said forward and rearward portions during said first position to present a flat top surface.

2. A vehicle utility table as set forth in claim 1 wherein said forward tray section and said rearward tray section includes:
    a frame, said frame having a front member, a rear member and side members;
    a generally flat supportive top portion covering said frame;
    said frame members having a covering means on their outside surfaces, said covering means forming a bottom portion and side portions.

3. A vehicle utility table as set forth in claim 2 wherein said bottom portion of said rearward tray section is depressed into said rearward tray section forming a generally flat surface circumscribed by a wall like structure which assists in retaining objects on said surface when said rearward tray section is folded upon said forward tray.

4. A vehicle utility table as set forth in claim 1 wherein said notches on said forward and rearward hinge portions form adjacently disposed arcuate bearing surfaces to support said rearward tray section in said first horizontal position preventing said rearward tray from being displaced below the horizontal position.

5. A vehicle utility table as set forth in claim 4 wherein said forward and rearward hinge portions are pivotally connected by said connecting link, said connecting link being entirely enclosed within said forward and rearward hinge portions to form a flat top surface parallel with said top portion of said tray sections when positioned in said first position.

6. A vehicle utility table as set forth in claim 1 wherein said forward tray section includes:
    a first pair of fixed pins oppositely disposed on the outside side portions near the front of said side portions and slidably connected to an aperture in a pivotal arm of said connecting means, and
    a second pair of fixed pins oppositely disposed parallel to said first pins, said second pins secured through apertures in a retaining arm pivotally connect to said pivotal arm of said connecting means by a snap on fastening means for quickly removing said utility table from said connecting means.

* * * * *